Nov. 24, 1959    E. GINGERICH ET AL    2,914,164
AUTO UTILITY TRAY
Filed July 22, 1957
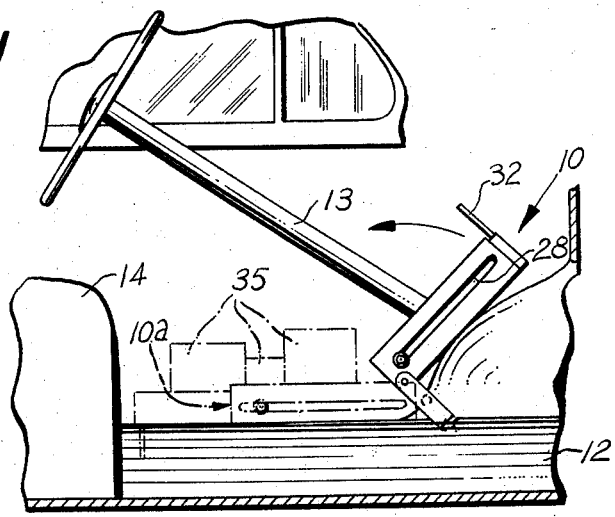
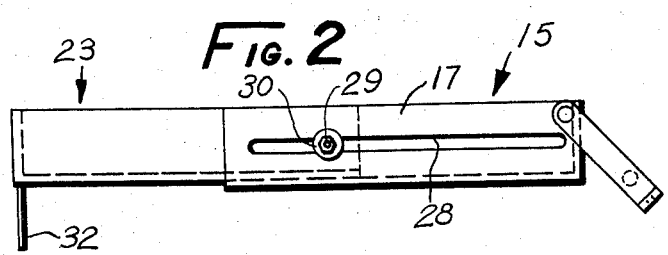
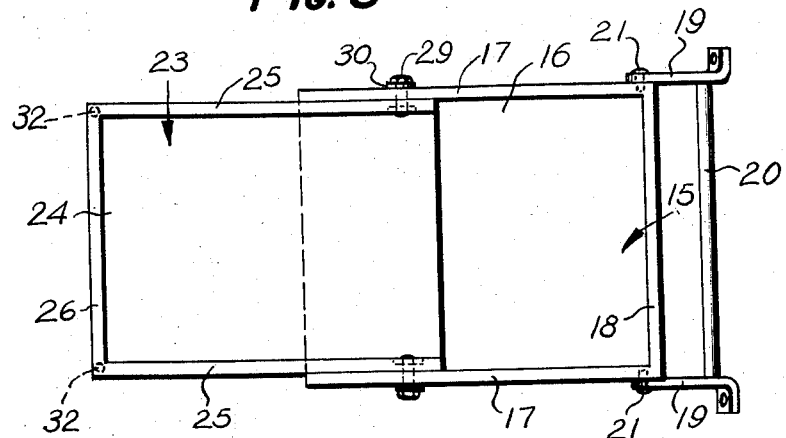
INVENTORS.
EDWARD GINGERICH
EDNA S. GINGERICH

United States Patent Office 2,914,164
Patented Nov. 24, 1959

2,914,164

AUTO UTILITY TRAY

Edward Gingerich and Edna S. Gingerich, De Queen, Ark.

Application July 22, 1957, Serial No. 673,453

1 Claim. (Cl. 206—19.5)

This invention relates to automotive vehicles and more particularly to a tray accessory therefore.

It is an object of the present invention to provide a utility tray for automotive vehicles of the type having a raised drive shaft housing adjacent to the driver's seat so as to provide a convenient storage space for receiving various small parcels, toys, and the like.

It is another object of the present invention to provide a utility tray for automobiles of the above type that is selectively movable between an operative extended position and a retracted inoperative position out of the way of the driver and passengers.

Other objects of the invention are to provide a utility tray bearing the above objects in mind which is of simple construction, has a minimum number of parts, is inexpensive to manufactuer and efficient in operation.

For other objects and for a better understanding of the invention, reference may be had to the following detailed description taken in conjunction with the accompanying drawing, in which:

Figure 1 is a fragmentary side elevational view of a tray made in accordance with the present invention in operative association with a vehicle in an inoperative position;

Figure 2 is an enlarged side elevational view of the tray shown in Figure 1, in an extended operative position; and Figure 3 is a top plan view of the apparatus shown in Figure 2.

Referring now more in detail to the drawing, the utility tray 10 made in accordance with the present invention is shown in operative association within an automotive vehicle of the type having a raised drive shaft housing 12 adjacent to the steering column 13 and the driver's seat 14.

As is more clearly shown in Figures 2 and 3, the utility tray assembly 10 includes a main tray 15 that is defined by a bottom wall 16, spaced parallel sides 17, and a single end wall 18. A mounting bracket that includes a pair of spaced parallel legs 19 which are integrally connected together by means of a spacer bar 20 is pivotally connected to the closed end of the main tray 15 by pivot elements 21 for pivotally mounting the unit upon the drive shaft housing 12. An auxiliary tray 23 defined by a bottom wall 24, spaced parallel sides 25 and a single end wall 26 is of slightly smaller dimensions than the main tray 15 and is slidably supported therein for reciprocating longitudinal movement. As is more clearly shown in Figure 2, the side walls 17 of the tray 15 are provided with longitudinal slots 28 which slidably receive laterally outwardly extending bolts 29 and associated washers 30 carried by the sides 25 of the auxiliary tray 23. Thus, the auxiliary tray 23 is slidably supported for telescoping movement between an extended operative position and a retracted position relative to the main tray. A pair of downwardly extending legs 32 of any desired length are secured to the outer free end of the auxiliary tray 23 for levelling the tray assembly when in use within the vehicle.

In actual use, the auxiliary tray may be retracted completely within the main tray 15 and the entire tray assembly rotated about the pivotal connection members 21 to the inoperative position shown in Figure 1, in which position, sufficient leg room is provided for all of the passengers in the front seat. However, by merely rotating the unit from the inclined position to the horizontal operative position 10a, the auxiliary tray 23 may be extended any desired amount so as to provide a substantially large storage compartment for receiving various types of packages 35, and the like. This telescoping action also permits the position 14 of the front seat to be adjusted without interference by the tray assembly. When in the folded inoperative position, the tray assembly may also provide a foot rest for the third person in the front seat so that a useful purpose is accomplished in all positions of the unit.

While various changes may be made in the detail construction, it shall be understood that such changes shall be within the spirit and scope of the present invention as defined by the appended claim.

What we claim as new and desire to protect by Letters Patent of the United States is:

A multiple position utility tray assembly for automatic vehicles comprising, in combination, a vehicle drive shaft housing portion of a vehicle body with its rear end portion adjacent the driver's seat and its forward end portion adjacent the steering column, a utility tray assembly, a mounting bracket, said tray assembly including a main tray and an auxiliary tray having portions consisting of a bottom wall, spaced parallel side walls and an end wall, the rear end of said main tray being open, the forward end of said auxiliary tray being open, the open end of said main tray being adapted to receive the open end of said auxiliary tray, means for guiding said trays in their sliding movement upon each other and retaining them to assembled position, said means including horizontal slots formed in the side walls of said main tray to receive laterally outwardly extending belts projecting from the side walls of said auxiliary tray, said mounting bracket including a pair of upwardly extending spaced parallel legs which are integrally connected together by a spacer bar secured intermediate the ends thereof, the upper ends of said legs pivotally connected to the closed end of said main tray by pivot elements, the lower end of said legs secured to said forward end portion of said drive shaft housing of suitable means, said tray assembly being rotatable upon said mounting bracket for movement between an upwardly and forwardly inclined inoperative position and a horizontal operative position relative to said drive shaft housing.

References Cited in the file of this patent

UNITED STATES PATENTS

| | | |
|---|---|---|
| 958,857 | Dennis | May 24, 1910 |
| 1,312,385 | Cahill | Aug. 5, 1919 |
| 2,807,516 | Barcafer | Sept. 24, 1957 |